Aug. 2, 1966  E. C. WEBB  3,263,997

AUTOMATIC PINFALL DETECTING APPARATUS FOR BOWLING GAME

Filed Aug. 30, 1963  2 Sheets-Sheet 1

INVENTOR.
ERNEST C. WEBB
BY
ATTORNEY

Aug. 2, 1966     E. C. WEBB     3,263,997
AUTOMATIC PINFALL DETECTING APPARATUS FOR BOWLING GAME
Filed Aug. 30, 1963     2 Sheets-Sheet 2

INVENTOR.
ERNEST C. WEBB
BY
ATTORNEY

United States Patent Office 3,263,997
Patented August 2, 1966

---

3,263,997
AUTOMATIC PINFALL DETECTING APPARATUS FOR BOWLING GAME
Ernest C. Webb, Bay Village, Ohio, assignor to Cleveland Trust Company, Cleveland, Ohio, as trustee
Filed Aug. 30, 1963, Ser. No. 305,593
3 Claims. (Cl. 273—54)

This invention relates to apparatus for automatically detecting the number of pins which remain standing on a pin deck after each ball is delivered in a bowling game. More particularly, the invention relates to bowling pin detecting apparatus in which no modification need be made to the pins themselves in order to detect them.

As is known, various systems have been proposed for detecting standing pins on a bowling alley pin deck by providing electrically detectable devices in the pins together with apparatus for detecting those devices. For example, in copending application Serial No. 134,809, filed September 7, 1961, pinfall detecting apparatus is described in which the number of pins knocked down by each ball is determined first producing a number of electrical impulses corresponding to the number of pins left standing, and thereafter using those impulses to produce a number of signals equal to ten minus the number of aforesaid pulses. This is accomplished in accordance with the said application by providing means in the top or bottom of each pin which can be detected electrically by a proximity device movable along a horizontal plane slightly above the tops or below the bottoms of standing pins and adapted to produce an impulse by passing over the top or under the bottom of any standing pin. For example, the means in the top or bottom of each pin may comprise a permanent magnet, and the proximity device may comprise an electrical coil assembly, the arrangement being such that the coil assembly will cut through the lines of flux produced by the permanent magnets whereby a current impulse is induced in the coil assembly each time it passes over or under a standing pin. The permanent magnets of fallen pins, however, cannot affect the coil and, hence, will not produce current impulses. By using the current impulses in electrical subtraction circuitry, a number of electrical signals can be obtained equal to ten minus the number of current impulses produced by the coil assembly, these signals being equal in number to the number of fallen pins.

While the system described above performs exceptionally well for its intended purpose and, in contrast to prior art devices, can detect standing pins which slide on the pin deck and are not correctly spotted, the use of electrically detectable devices such as metal slugs or the like in bowling pins for detection purposes may be considered undesirable under certain circumstances.

Accordingly, as one object, the present invention seeks to provide bowling pin detecting apparatus in which the pins are detected without providing any metallic or the like devices in the pins themselves, while at the same time facilitating detection of standing pins which are not correctly spotted.

More generally, an object of the invention is to provide new and improved standing pin detecting apparatus wherein the pins are detected by physical contact with a detecting element.

Another object of the invention is to provide standing pin detecting elements which make physical contact with the pins, but which minimize any possibility of a wobbling pin being accidentally knocked over by such physical contact.

A further object of the invention is to provide pinfall detecting apparatus for a bowling game capable of producing electrical signals which may be used in an automatic scoring, totalizing, indicating and/or printing system.

In accordance with the invention, the apparatus for detecting standing pins comprises a member movable along a substantially horizontal path past the tops of standing bowling pins, at least one pair of resilient, generally vertical devices carried on said member and arranged to engage the top of a pin as the member passes the pin, the resilient devices being of electrical conducting material and arranged such that the one resilient device will be deflected in a generally horizontal direction to contact the other resilient device when the member passes the top of a standing pin, and electrical circuit means connected to said resilient devices such that an electrical circuit will be completed to indicate the existence of a standing pin when one resilient device contacts the other. Preferably, the resilient devices comprise parallel rows of vertically-disposed, wire-like elements carried on the aforesaid member transverse to its path of travel such that the wire-like elements in one row will engage the top of a standing pin and be deflected in a generally horizontal direction to contact those in the other row when the member passes the top of the standing pin. By virtue of the light weight and resilient character of the rows of wire-like elements, very little possibility exists of knocking over a pin when they contact the top of that pin, even though it be wobbling.

The above and other objects and features of the invention will become apparent from the following detailed description taken in connection with the accompanying drawings which form a part of this specification, and in which.

Figure 1:
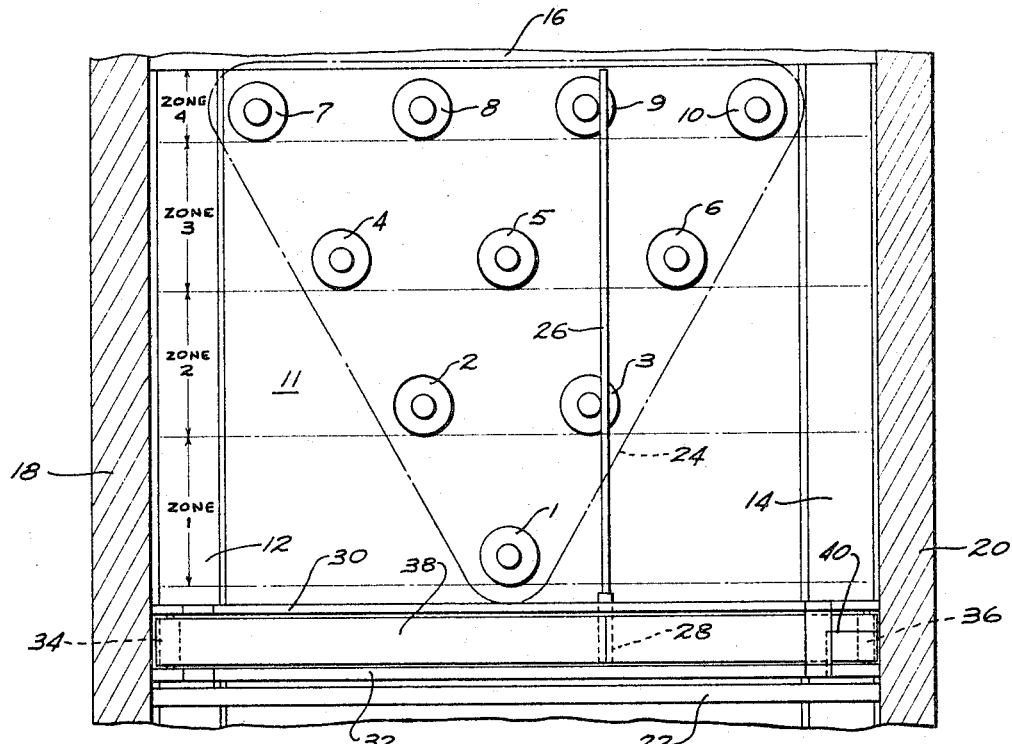
FIGURE 1 is a top view of a bowling alley pin deck showing one manner in which the pin detecting devices of the invention can be swept along a horizontal path across the tops of pins.

Referring now to the drawings, and particularly to FIG. 1, a conventional bowling alley pin deck 11 is shown having ten pins positioned thereon in the usual triangular configuration and numbered 1 through 10. On either side of the pin deck 11 are gutters 12 and 14, while behind the pin deck 11 is a pit 16. On either side of the pin deck 11 are kickbacks 18 and 20 which serve, among other things, to separate adjacent bowling alleys. Extending between the kickbacks 18 and 20 is a facing board 22 which, in accordance with the usual bowling alley construction, covers an automatic pin-spotter and its associated mechanism in its raised position, but does not extend down far enough toward the alley to obstruct the view of the pins positioned thereon. The outline of the pin-spotter is shown in FIG. 1 by the broken line 24.

Above the pins 1–10 positioned on the pin deck 11 is a bar or rod-like member 26 which extends parallel to the long transverse dimension of the bowling alley and is adapted to be moved across the tops of the pins along a substantially horizontal path which extends transverse to the long transverse dimension of the bowling alley. The member 26 is swept across the ends of pins 1–10 in the embodiment of the invention shown in FIG. 1 by means of a mechanism which is the subject of copending application Serial No. 199,063, filed May 31, 1962, and now Patent No. 3,185,477. For a full and detailed description of the traversing mechanism, reference may be had to the aforesaid patent; however for purposes of the present application it will be sufficient to state that the member 26 is suspended from a carriage 28 in cantilever beam relationship, the carriage 28 being movable along guideways or tracks 30 and 32 both located at the forward end of the pin-spotter 24 and extending between the kickbacks 18 and 20. At opposite ends of the guideways 30 and 32 are rolls 34 and 36, extending around the rolls 34 and 36 is a taut band 38 of spring steel or the like. This band is connected, at one point along its length, to the carriage 28, the arrangement being such that as the band moves around the rolls 34 and 36, the carriage 28 and the member 26 carried thereby will be caused to traverse the pin deck 11. A motor 40 is employed to rotate the roll 36 and thus cause the band 38 to move around rolls 34 and 36 in a manner which is more fully explained in the aforesaid Patent No. 3,185,477. The important point, for purposes of the present invention, is that the member 26 is suspended from carriage 28 in cantilever beam relationship and is moved transversely across the alley from one side to the other along the tracks or guideways 30 and 32.

Figure 2:
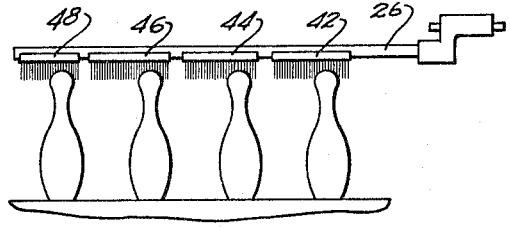
FIG. 2 is a plan view of the bowling alley pin deck of FIG. 1 showing the relative locations of the pin deck, pins and pin detecting elements.

With reference now to FIG. 2, it will be noted that spaced along the length of the bar or rod-like member 26 are four pin detecting devices 42, 44, 46 and 48. The first pin detecting device 42 extends from a point slightly in front of the number 1 pin to a point slightly in front of the row of pins comprising pins 2 and 3. As this pin detecting device 42 moves across the pin deck 11, it traverses a zoned area identified as Zone I in FIG. 1. The second pin detecting device 44 extends from a point slightly in front of the row of pins comprising pins 2 and 3 to a point slightly in front of the row of pins comprising pins 4, 5 and 6. The area traversed by the pin detecting device 44, therefore, is identified as Zone II in FIG. 1. The third pin detecting device 46 extends from a point slightly in front of the third row of pins (i.e., pins 4, 5 and 6) to a point slightly in front of the fourth row of pins and traverses Zone III identified in FIG. 1. Finally, the fourth pin detecting device 48 extends from a point slightly in front of the fourth row of pins to the trailing edge of the pin deck and traverses an area identified as Zone IV in FIG. 1.

The necessity for a plurality of zones will be appreciated when it is remembered that it is necessary to produce a single and separate electrical signal for each standing pin on the deck 11. It can be seen from FIG. 1 that the number 1 pin is directly in front of the number 5 pin. Similarly, the number 2 pin is directly in front of the number 8 pin, and the number 3 pin is directly in front of the number 9 pin. If a single pin detecting device of the type hereinafter described were swept across the tops of the pins, a single electrical signal would be produced for both of the pins 2 and 8, both of the pins 1 and 5, and both of the pins 3 and 9, meaning that if all pins were standing, only seven electrical signals would be produced by the single pin detecting device; whereas it is desired to produce ten signals. With the arrangement shown herein, however, none of the pins in any zone are aligned with other pins in that same zone so that the cumulative number of signals produced by the four pin detecting devices will always be ten, assuming that all of the pins are left standing. Of course, if certain ones of the pins are knocked down after a ball is delivered, only the cumulative number of signals corresponding to the number of pins left standing will be produced by the pin detecting devices. Furthermore, even though certain ones of the pins may slide backward on the deck to positions where they are directly in front of the other pins, the correct number of signals will always be produced.

To illustrate, suppose that the number 4 pin slides to a position where it is directly in front of the number 7 pin. Under these circumstances, two electrical signals will still be produced for the number 4 and 7 pins, with the signal for the number 4 pin being produced by detecting device 46 while the signal for pin number 7 is produced by detecting device 48. Thus, the apparatus shown provides a means whereby a single current impulse will be produced by one of the detecting devices 42–48 for each standing pin even though certain ones of the pins may slide from their correctly-spotted positions.

Figure 4A:
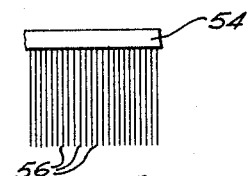
FIG. 4A is a broken-away view of the wire-like assembly used in the pin detector of the invention.
Figure 3:
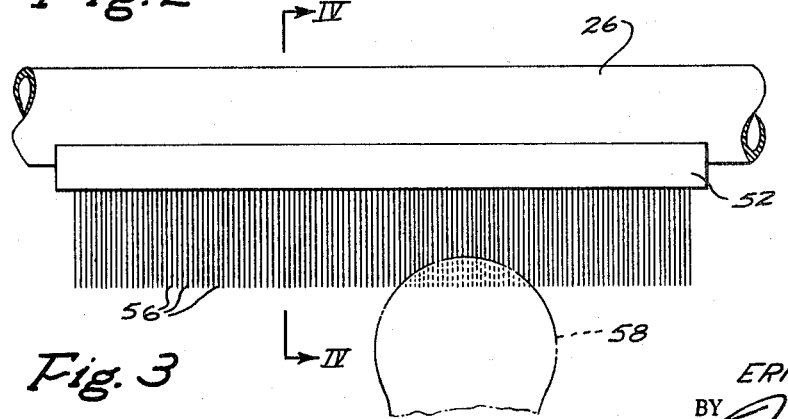
FIG. 3 is an enlarged side view of one of the pin detecting elements of the present invention.
Figure 4:
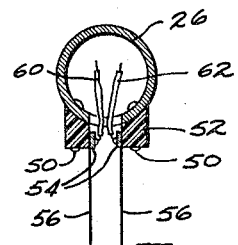
FIG. 4 is a cross-sectional view taken along the line IV—IV of FIG. 3.
Figure 5:
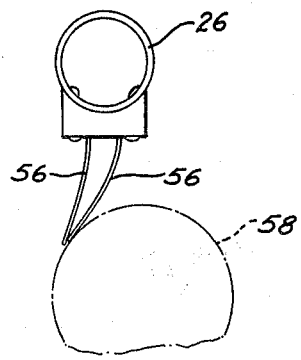
FIG. 5 is a view, similar to that of FIG. 4, showing the deflection in the resilient wire-like members of the pin detecting device of FIGS. 3 and 4 when they contact the end of a pin to be detected.

Referring now to FIGS. 3 and 4, the pin detecting device 42 is shown, it being understood that the other pin detecting devices are identical in construction. Secured to the bottom of the bar or member 26 by means of rivets 50 or other suitable fastening means is an insulating block 52. Cast within the blocks 52 are copper or other electrically-conducting metal strips 54, one of the strips being shown in FIG. 4A before it is cast into the insulating block 52. As shown, there are two strips 54 in the insulating block 52 which are parallel to each other and also parallel to the bar 26. Soldered or otherwise securely fastened to the strips 54 are downwardly-depending wires or whiskers 56 of electrical conducting material which, in effect, form a comb or brush as best shown in FIG. 3. The whiskers 56 are of sufficient stiffness and resiliency so as to be normally separated as shown in FIG. 4. When, however, the bar 26 passes over the top of a pin 58 shown in FIGS. 3 and 5, the one row of whiskers 56 will be deflected so as to contact the other row. By connecting each strip 54 and its associated whiskers 56 to electrical leads 60 and 62, it will be appreciated that the whiskers 56 act, in effect, as a switch between the leads 60 and 62 when they pass over the top of a standing pin and one row of whiskers is deflected to contact the other.

Figure 6:
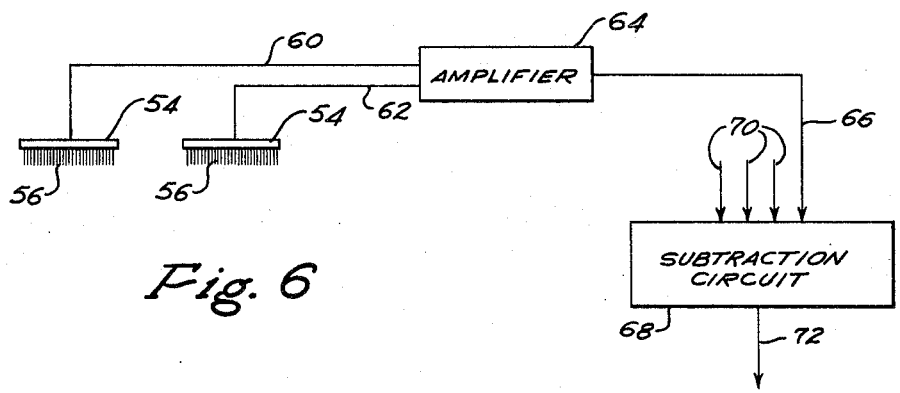
FIG. 6 is a schematic circuit diagram of the means for converting electrical signals indicative of the number of standing pins into signals indicative of the number of fallen pins.

FIG. 6 shows the manner in which the whiskers 56 may be connected to an electrical circuit which indicates the existence of a standing pin when the whiskers pass over the top of that pin. Thus, the leads 60 and 62 are connected to an amplifier 64 which, in turn, is connected through lead 66 to a subtraction circuit 68 which may, for example, be of the type shown in copending application Serial No. 175,865, filed February 9, 1962. The amplifier 64 is used to permit a relatively low voltage between leads 60 and 62 and thereby prevent arcing. An amplifier similar to amplifier 64 is provided for the other pin detecting devices 44, 46 and 48 and is connected to the subtraction circuit 68 through leads 70, the arrangement being such that a number of pulses equal to the number of standing pins will appear on leads 66 and 70. These pulses are subtracted from ten in subtraction circuit 68 to produce a number of pulses on lead 72 equal to the number of fallen pins. In this manner, as the bar 26 passes over the tops of standing pins on pin deck 11, a number of pulses will be produced on lead 72 equal to the number of fallen pins.

When the bar 26 passes over the tops of the standing pins, certain ones of those pins may wobble for the reason that the pin detection cycle takes place with the bar sweeping across the tops of the pins immediately after a ball is delivered in each frame of the game. In any pin detecting system wherein the pins are physically contacted, care must be taken to avoid knocking over the pins during the detection process. By using the rows of wire-like elements or whiskers 56, however, a minimum amount of pressure is applied to the pins during the detection cycle and very little possibility exists of their being knocked over, eevn though they may be wobbling.

Figure 7:
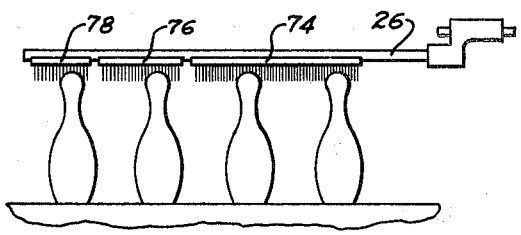
FIG. 7 is a plan view, similar to that of FIG. 2, but of an alternative form of the invention.

Another embodiment of the invention is shown in FIG. 7 wherein three pinfall detecting devices 74, 76 and 78 are carried on the bar 26 rather than the four devices shown in FIG. 2. In this latter case, the first pinfall detecting device extends from a point slightly ahead of the number 1 pin to a point slightly ahead of the 4, 5, 6 row of pins. In effect, therefore, the pinfall detecting device 74 combines the functions of devices 42 and 44 shown in FIG. 2. In certain cases, the single pin detecting device 74 may suffice for the reason that if the number 1 pin is struck by a ball it will almost invaribly be knocked down rather than slide. Of course, for maximum reliability, the embodiment of FIG. 2 should be employed.

Although the invention has been shown in connection with certain specific embodiments, it will be readily apparent to those skilled in the art that various changes in form and arrangement of parts may be made to siut requirements without departing from the spirit and scope of the invention. In this respect, it will be understood that downwardly-depending elements, either flexible or rigid, may be piovtally connected to the underside of member 26 as a substitute for the wires 56. In this latter case, the downwardly-depending elements will be electrically conducting such that upon passage over a pin, the one element will strike the top of the pin and will rotate about its pivotal connection to the member 26 to engage the other element which will then also rotate about its pivotal connection and pass over the pin. In this process, contact of the one element with the other will complete a circuit to indicate the existence of the standing pin.

I claim as my invention:

1. In combination, a bowling pin standing on a bowling alley pin deck, a member movable along a substantially horizontal path past an end of said pin, a pair of resilient generally vertical devices of equal vertical length carried on said member and arranged to engage the end of the pin as said member passes the end of the pin such that one resilient device will be deflected in a generally horizontal direction to contact the other resilient device when the member passes said end of the pin, said resilient devices being electrically conducting, and electrical circuit means connected to said devices such that an electrical circuit will be completed to indicate the existence of a standing pin when said one device contacts the other, the resilient devices forming switch contacts in the circuit means independently of any auxiliary switches.

2. In combination, a bowling pin standing on a bowling alley pin deck, a member movable along a substantially horizontal path past an end of said pin, parallel rows of vertically-disposed wire-like elements carried on said member such that the wire-like elements in one row will engage the end of said pin and be deflected to contact those in the other row when the member passes the end of the standing pin, the wire-like elements in the respective rows being of equal vertical length, and electrical circuit means connected to said parallel rows such that an electrical circuit will be completed to indiacte the existance of the standing pin when the wire-like elements in one row contact those in the other row upon passage past the end of the pin, said wire-like elements which contact the pin acting as switch contacts in said electrical circuit.

3. In combination, a bowling pin standing on a bowling alley pin deck, a member movable along a substantially horizontally path past an end of said pin, a pair of generally vertical devices of equal vertical length carried on said member and arranged to engage the end of the pin as said member passes the end of the pin such that one device will be deflected in a generally horizontal direction to contact the other device when the member passes said end of the pin, said devices being electrically conducting, and electrical circuit means connected to said devices such that an electrical circuit will be completed to indiate the existence of the standing pin when said one device contacts the other, the vertical devices which engage the end of the pin acting as switch contacts in said electrical circuit means.

References Cited by the Examiner

UNITED STATES PATENTS

| | | | |
|---|---|---|---|
| 2,226,930 | 12/1940 | Hefele | 200—61.44 X |
| 2,270,687 | 1/1942 | Morse | 200—61.44 |
| 3,017,618 | 1/1962 | Cross | 200—61.41 X |

DELBERT B. LOWE, *Primary Examiner.*

ANTON O. OECHSLE, *Examiner.*